US007038210B2

(12) United States Patent
Tanaka et al.

(10) Patent No.: US 7,038,210 B2
(45) **Date of Patent: *May 2, 2006**

(54) PET DEVICE

(75) Inventors: Eiichi Tanaka, Hamamatsu (JP); Takaji Yamashita, Hamamatsu (JP); Hiroyuki Okada, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 166 days.

This patent is subject to a terminal disclaimer.

(21) Appl. No.: 10/362,940

(22) PCT Filed: Aug. 29, 2001

(86) PCT No.: PCT/JP01/07425

§ 371 (c)(1), (2), (4) Date: Feb. 27, 2003

(87) PCT Pub. No.: WO02/18974

PCT Pub. Date: Mar. 7, 2002

(65) Prior Publication Data

US 2003/0189174 A1 Oct. 9, 2003

(30) Foreign Application Priority Data

Aug. 30, 2000 (JP) ............................ 2000-261526

(51) Int. Cl.
*G01T 1/164* (2006.01)

(52) U.S. Cl. ................................................ 250/363.03

(58) Field of Classification Search ............ 250/363.03

See application file for complete search history.

(56) References Cited

U.S. PATENT DOCUMENTS

| | | | | |
|---|---|---|---|---|
| 4,575,868 | A * | 3/1986 | Ueda et al. | 378/4 |
| 6,674,083 | B1 * | 1/2004 | Tanaka et al. | 250/363.03 |
| 2002/0179843 | A1 | 12/2002 | Tanaka | 250/363.03 |

FOREIGN PATENT DOCUMENTS

| | | |
|---|---|---|
| JP | 05-209964 | 8/1993 |
| JP | 07-198853 | 8/1995 |
| JP | 08-262141 | 10/1996 |

(Continued)

OTHER PUBLICATIONS

C.J. Thompson, et al., *Simultaneous Transmission and Emission Scans in Positron Emission Tomography, IEEE Transactions on Nuclear Science*, Feb. 1989, vol. 36, No. 1, pp. 1011-1016.

(Continued)

*Primary Examiner*—Constantine Hannaher
(74) *Attorney, Agent, or Firm*—Drinker Biddle & Reath LLP

(57) ABSTRACT

A rotating ceptor 20 provided inside a detector portion 10 includes nine shield plates $S_1$ to $S_9$ disposed in parallel to each other in between adjacent detector rings R, acts as a collimator, and allows only those photon pairs that have traveled approximately parallel to a slice plane to be made incident upon photon detectors D located behind the rotating ceptor 20. Each of the shield plates S is not formed annularly, and provided near the measurement field of view 1 of part of N photon detectors D that constitute each of the detector rings R. The rotating ceptor 20 is rotatable about its center axis. Each of the shield plates S is provided with bar-shaped radiation source insertion holes 20*a* and 20*b* for allowing a bar-shaped positron emission radiation source 3 to be inserted therein and supported thereby.

10 Claims, 11 Drawing Sheets

FOREIGN PATENT DOCUMENTS

| | | |
|---|---|---|
| JP | 09-318754 | 12/1997 |
| JP | 2000-284051 | 10/2000 |

OTHER PUBLICATIONS

E. Tanaka, et al., *Feasibility Study on PET Scanners allowing 3D/2D Simultaneous Data Acquisition Using Rotating Partial Slice Septa, 1999 International Meeting on Fully Three-Dimensional Image Reconstruction in Radiology and Nuclear Medicine*, Jun. 23-26, 1999, pp. 325-328.

E. Tanaka,et al., *A 2D/3D Hybrid PET Scanner with Rotating Partial Slice-Septa and its Quantitative Procedures, Physics in Medicine and Biology*, Oct. 2000, vol. 45, No. 10, pp. 2821-2841.

* cited by examiner

PET DEVICE

TECHNICAL FIELD

1. Background Art

The present invention relates to a PET device by which the behavior of a tracer labeled by a positron emission radiation source can be imaged.

2. Description of the Related Art

The PET (Positron Emission Tomography) device detects pairs of 511 keV photons (gamma rays) that occur upon annihilation of electron positron pairs in a living body (subject) having a positron emission radiation source injected therein and then travel in directions opposite to each other, thereby imaging the behavior of the tracer within the subject.

The PET device comprises a detector portion having multiple small photon detectors that are disposed around a measurement field of view in which the subject is placed. The PET device employs a simultaneous counting method to count photon pairs generated upon annihilation of electron positron pairs and accumulates the count (hereinafter referred to as the "radiation measurement"). In accordance with multiple pieces of simultaneous count information or projection data (hereinafter referred to as the "radiation data") that has been accumulated in the radiation measurement, the images that represent the spatial distribution of the frequency of occurrence of photon pairs in the measurement field of view are reconstructed.

The PET device plays an important role in the field of nuclear medicine and can be employed, for example, to study the functions of living bodies or high-level functions of the brain.

Furthermore, to correct for the absorption of 511 keV photons in a subject, the radiation data is processed to correct for absorption as follows. That is, a calibration positron emission radiation source (e.g., $^{68}$Ge—$^{68}$Ga) is rotated around the subject placed in the measurement field of view so as to detect photon pairs and accumulate the resulting data (hereinafter referred to as the "transmission measurement") using the simultaneous counting method. Multiple pieces of simultaneous count information or projection data (hereinafter referred to as the "transmission data") that have been accumulated through this transmission measurement are acquired. In accordance with the transmission data, the radiation data is processed to correct for absorption.

Furthermore, to correct for variations in sensitivity of each of the multiple photon detectors, the following steps are employed to correct for the sensitivity of each photon detector. That is, without the subject placed in the measurement field of view, the calibration positron emission radiation source is rotated to detect photon pairs and accumulate the resulting data using the simultaneous counting method (hereinafter referred to as the "blank measurement"). Accordingly, multiple pieces of simultaneous count information or the projection data (hereinafter referred to as the "blank data") that have been accumulated through the blank measurement are acquired.

Then, in accordance with the blank data, a sensitivity correction coefficient is determined for each photon detector and stored in a memory. Using these sensitivity correction coefficients, the sensitivity of the projection data in the radiation measurement and the transmission measurement is corrected. The blank measurement is performed at appropriate time intervals (e.g., every week) according to stability in the sensitivity of each photon detector.

Such PET devices are largely divided into two types: a two-dimensional PET device and a three-dimensional PET device. On the other hand, in recent years, a ceptor retractable PET device has also been employed widely which can be used either as a two-dimensional PET device or three-dimensional PET device.

FIG. 9A and FIG. 9B are explanatory views illustrating the configuration of a detector portion 10 and a slice ceptor 20 in a ceptor retractable PET device. FIG. 9A is a view illustrating the detector portion 10 when viewed in a direction parallel to the center axis, FIG. 9B being a cross-sectional view of the detector portion 10 taken along a plane containing the center axis.

The detector portion 10 of the ceptor retractable PET device comprises detector rings $R_1$ to $R_8$ that are stacked in layers in the direction of the center axis. Each of the detector rings R comprises multiple photon detectors $D_1$ to $D_N$ disposed annularly on a slice plane that is perpendicular to the center axis. For example, each of the photon detectors D is a scintillation detector into which a scintillator such as BGO ($Bi_4Ge_3O_{12}$) and a photo-multiplier tube are combined, and designed to detect photons that have traveled from a measurement field of view 1 containing the center axis and have reached there.

Additionally, the detector portion 10 is provided therein with the slice ceptor 20. The slice ceptor 20 comprises nine annular shield plates $S_1$ to $S_9$ that are disposed between the adjacent detector rings R, and is movable in the direction of the center axis. Furthermore, a ceptor retract portion 30 having a space for retracting the slice ceptor 20 is provided therein.

With the slice ceptor 20 being placed in the measurement field of view 1, the collimating operation of the slice ceptor 20 allows the detector portion 10 of the ceptor retractable PET device to count simultaneously only those photon pairs that have traveled in a direction approximately 90 degrees to the center axis (i.e., in a direction approximately parallel to the slice plane).

That is, the simultaneous count information or the two-dimensional projection data that has been obtained in the detector portion 10 and accumulated is limited only to those from a pair of photon detectors that is contained in the same detector ring or an adjacent (or closely located) detector ring. Therefore, in this case, it is possible to efficiently eliminate scattered radiation derived from scattered photons that have been generated outside the measurement field of view 1, and easily correct for absorption and sensitivity in the two-dimensional projection data (radiation data) as well.

On the other hand, with the slice ceptor 20 having been retracted in the retract space of the ceptor retract portion 30 from the measurement field of view 1, the detector portion 10 of the ceptor retractable PET device is capable of counting simultaneously photon pairs that have traveled from all the directions. That is, the simultaneous count information or the three-dimensional projection data that is obtained in the measurement field of view 1 and accumulated can be those that are derived from a pair of photon detectors contained in any detector ring. Therefore, in this case, photon pairs can be simultaneously counted with as a high sensitivity as five to ten times the sensitivity provided with the slice ceptor 20 being placed in the measurement field of view 1.

Such a ceptor retractable PET device acquires two-dimensional projection data with the slice ceptor 20 being placed in the measurement field of view 1, according to applications, or acquires three-dimensional projection data with the slice ceptor 20 being retracted from the measurement field of view 1. For example, this type of PET device allows the slice ceptor 20 to be placed in the measurement field of view 1, a subject 2 to be placed in the measurement field of view 1, and a calibration positron emission radiation source 3 to be rotated around the subject 2 in order to perform the transmission measurement to acquire the two-dimensional transmission data.

Furthermore, the PET device allows the slice ceptor 20 to be retracted from the measurement field of view 1, the calibration positron emission radiation source 3 to be removed, and the subject 2 into which a radio-pharmaceutical containing a positron emission radiation source is injected to be placed in the measurement field of view 1 in order to perform the three-dimensional radiation measurement to acquire the three-dimensional radiation data. The two-dimensional radiation measurement may also be performed to acquire the two-dimensional radiation data with the slice ceptor 20 remaining placed in the measurement field of view 1. Then, in accordance with the transmission data, the radiation data is corrected for absorption to reconstruct images.

FIG. 10A, FIG. 10B, and FIG. 10C are explanatory views illustrating the time schedule for the radiation measurement and transmission measurement. These figures show time schedules of three types. In the time schedule shown in FIG. 10A, the radiation measurement is performed after the transmission measurement. First, the subject 2 is placed in the measurement field of view 1 with the slice ceptor 20 being inserted into the measurement field of view 1, the calibration positron emission radiation source 3 is disposed between the subject 2 and the slice ceptor 20 in parallel to the center axis, and then the positron emission radiation source 3 is rotated about the center axis to perform the transmission measurement, thereby acquiring the two-dimensional transmission data.

Then, with the positron emission radiation source 3 being retracted, a radio-pharmaceutical is injected into the subject 2, and then a period of time is allowed to elapse which is required for the radio-pharmaceutical to accumulate in a target organ of the subject 2. The radiation measurement is then performed to acquire the radiation data. In this radiation measurement, the three-dimensional radiation data may also be acquired with the slice ceptor 20 being retracted from the measurement field of view 1, or alternatively, the two-dimensional radiation data may be acquired with the slice ceptor 20 being placed in the measurement field of view 1.

When the two-dimensional radiation data has been acquired, it is possible to immediately correct for the absorption in the two-dimensional transmission data, thereby reconstructing two-dimensional images. On the other hand, when the three-dimensional radiation data has been acquired, the correction for the absorption is performed as follows. That is, in accordance with the two-dimensional transmission data, the two-dimensional image is reconstructed for each slice based on the X-ray CT principle to calculate an absorption coefficient image for each slice. The absorption coefficient images for each slice are aggregated to prepare a three-dimensional absorption coefficient image.

Then, in accordance with the three-dimensional absorption coefficient image, absorption transmission ratios are calculated for various three-dimensional projection directions. In accordance with the resulting absorption transmission ratio, the radiation data is corrected for absorption to reconstruct the three-dimensional image.

In the aforementioned time schedule shown in FIG. 10A, the transmission measurement and the radiation measurement are performed independent of each other, thereby making it possible to perform the measurement in the most positive manner.

However, this time schedule requires the subject 2 to be restrained on a bed in the measurement field of view 1 for the longest time period, thereby placing an enormous burden on the subject 2 and providing the worst throughput of the examination. Additionally, the subject 2 is easily displacement to be at different positions during each period of time for the transmission measurement and the radiation measurement, thereby causing artifacts to be readily produced.

In the time schedule shown in FIG. 10B, the transmission measurement is performed after the radiation measurement (this measurement is hereinafter referred to as the "transmission measurement after injection"). In this transmission measurement after injection, the time required for the subject 2 to be restrained on the bed in the measurement field of view 1 is shorter compared with the time schedule shown in FIG. 10A. However, in the transmission measurement after injection, where the half life of the radio-pharmaceutical is comparatively long such as $^{18}$F (having a half life of 110 minutes), the transmission data obtained from the transmission measurement may contain not only data derived from the calibration positron emission radiation source 3 but also data derived from the radio-pharmaceutical injected into the subject 2. This requires the transmission data to be corrected.

On the other hand, in the time schedule shown in FIG. 10C, the radiation measurement and the transmission measurement are performed at the same time (this measurement is hereinafter referred to as the "simultaneous radiation and transmission measurement"). In this simultaneous radiation and transmission measurement, the time required for the subject 2 to be restrained on the bed in the measurement field of view 1 is much shorter compared with the transmission measurement after injection. The examination throughput is the highest. Those artifacts caused by the displacement of the subject 2 are hardly produced. Therefore, the burden placed on the subject 2 is significantly reduced. However, like the radiation measurement after injection, in the simultaneous radiation and transmission measurement, the transmission data may contain those data derived from the radio-pharmaceutical injected into the subject 2 and as well the radiation data may contain those data derived from the calibration positron emission radiation source 3. This requires these effects to be corrected.

In cases where the transmission measurement is performed with a radio-pharmaceutical being present in the subject 2 like the transmission measurement after injection or the simultaneous radiation and transmission measurement, in order to acquire the transmission data and the radiation data distinguished from each other, the sinogram window method is employed as described below.

FIG. 11A and FIG. 11B are explanatory views illustrating the sinogram window method. FIG. 11A shows the projection data obtained by performing the two-dimensional simultaneous radiation and transmission measurement with the slice ceptor 20 being placed in the measurement field of view 1, FIG. 11B shows the sinogram of the projection data.

As shown in FIG. 11A, the projection data represents the distribution of simultaneous count information on the t-axis orthogonal to the projection direction with respect to each projection direction (each value for projection angles θ). Additionally, as shown in FIG. 11B, the sinogram has an array of projection data in the order of the projection angle values θ, representing the distribution of the simultaneous count information on the t-θ plane.

As shown in FIG. 11B, the data derived from the calibration positron emission radiation source 3 appears in the shape of a sinusoidal curve on the sinogram, and the sinusoidal curve moves in the direction of θ as the positron emission radiation source 3 rotates. It is possible to know the position of the sinusoidal curve on the sinogram, at which the data derived from the positron emission radiation source 3 appears, by detecting the angular position of the positron emission radiation source 3.

In this context, a region of a predetermined width containing the sinusoidal curve on the sinogram in which the data derived from the positron emission radiation source 3 appears is defined as a sinogram window. The data within this sinogram window is defined as the transmission data, while the data outside the sinogram window is defined as the radiation data, the transmission data and the radiation data being collected separately from each other.

The resulting transmission data contains part of the radiation data, however, it is possible to correct for the transmission data by subtracting the data estimated based on the radiation data near the sinogram window from the transmission data. Additionally, part of the transmission data is contained in the radiation data due to scattering, however, it is possible to correct for the radiation data by subtracting the transmission data multiplied by a certain coefficient from the radiation data.

DISCLOSURE OF THE INVENTION

However, the following problems were present when the two-dimensional simultaneous radiation and transmission measurement was carried out. That is, a photon detector located near the calibration positron emission radiation source 3 is made incident upon photons derived from the positron emission radiation source 3 with a higher frequency compared with those photons derived from the radio-pharmaceutical injected into the subject 2. Therefore, in response to the limit of the photon detection time resolution of the photon detector, each radiation strength is limited which is emitted from the radio-pharmaceutical injected into the subject 2 and the calibration positron emission radiation source 3, thereby causing a long period of time to be required for measurement.

The three-dimensional transmission measurement performed with the slice ceptor being retreated from the measurement field of view suffers more seriously not only from the aforementioned problems but also from inaccurate correction for absorption due to intrusion of a large quantity of scattering simultaneous counts into the transmission data. Therefore, it is substantially impossible to perform the three-dimensional transmission measurement. On the other hand, a three-dimensional PET device having no slice ceptor employs a practical method for scanning around a subject with a $^{137}Cs$ collimated point radiation source along a helical orbit to obtain the transmission data by the helical X-ray CT principle. However, since this PET device cannot employ the sinogram window method, it is impossible to perform the simultaneous radiation and transmission measurement.

The simultaneous radiation and transmission measurement using a PET device is described in an article by C. J. Thompson, et al., entitled "Simultaneous Transmission and Emission Scans in Positron Emission Tomography", IEEE Trans. Nuclear Science, Vol.36, No.1, pp.1011–1016 (1989). This PET device is provided with sub-collimators across a point radiation source in addition to an annular slice ceptor to perform the simultaneous radiation and transmission measurement while the point radiation source in between the sub-collimators is being rotated. However, the PET device described in this article cannot solve the aforementioned problems.

On the other hand, in Japanese Patent Laid-Open Publication No.Hei 5-209964, disclosed is an emission CT device that has a turbo fan collimator. This device is provided with a through-hole at a shielding portion having no collimator, and a radiation source for correcting sensitivity is inserted into the through-hole. However, the invention disclosed in this publication is related to a method for attaching and accommodating a radiation source for correcting sensitivity, and thus different from the object of the present application. Additionally, the invention disclosed in this publication is related to a SPECT (Single Photon Emission Computed Tomography) device that employs a gamma ray emission nuclide, and thus differs from the PET device according to the present invention which employs a positron emission radiation source to simultaneously count photon pairs.

The present invention was developed to solve the aforementioned problems. It is therefore the object of the present invention to provide a PET device which allows images to be measured in a short period of time and is reconstructed with high accuracy.

A PET device according to the present invention wherein, (1) a detector portion having multiple detector rings on which multiple photon detectors each for detecting photons traveling from a measurement field of view containing a center axis are disposed on the slice plane perpendicular to the center axis, the multiple detector rings being stacked in layers in a direction parallel to the center axis; (2) a rotating ceptor disposed rotatably about the center axis near the measurement field of view of part of the multiple photon detectors which constitute each of the multiple sets of detector rings, the rotating ceptor including multiple shield plates for collimating and passing therethrough only those photons that have traveled approximately parallel to the slice plane; (3) radiation source support means for detachably supporting a calibration positron emission radiation source at a position at which photons produced by positrons emitted from the positron emission radiation source are collimated by the rotating ceptor in all directions parallel to the slice plane; (4) rotating ceptor position determination means for determining whether the rotating ceptor is present near the measurement field of view of at least one of a pair of photon detectors when the pair of photon detectors of the photon detectors included in the detector portion simultaneously counts photon pairs; (5) two-dimensional projection data accumulating means for accumulating simultaneous count information on photon pairs detected by the pair of photon detectors when the rotating ceptor position determination means has determined that the rotating ceptor is present near the measurement field of view of at least one of the pair of photon detectors; (6) three-dimensional projection data accumulating means for accumulating simultaneous count information on photon pairs detected by the pair of photon detectors when the rotating ceptor position determination means has determined that the rotating ceptor is not present near any one of the measurement fields of view of the pair of photon detectors; and (7) image reconstruction means for reconstructing an image representing a spatial distribution of frequencies of occurrence of photon pairs in the measurement field of view in accordance with the two-dimensional projection data produced by accumulating simultaneous count information by means of the two-dimensional projection data accumulating means and the three-dimensional projection data produced by accumulating simultaneous count information by means of the three-dimensional projection data accumulating means, are provided.

According to this PET device, when photon pairs traveling from a measurement space are simultaneously counted by means of a pair of photon detectors of the detector portion, the rotating ceptor position determination means determines whether the rotating ceptor is present near a measurement space of at least one of the pair of photon detectors. This determination is performed in accordance with the rotational position of the rotating ceptor detected by the rotational position sensor.

When the rotating ceptor position determination means has determined that the rotating ceptor is present near at least one measurement space, the two-dimensional projection data accumulating means accumulates the simultaneous count information on the photon pairs detected by the pair of photon detectors.

On the other hand, when the rotating ceptor position determination means has determined that the rotating ceptor is not present near the measurement space, the three-dimensional projection data accumulating means accumulates the simultaneous count information on photon pairs detected by the pair of photon detectors.

Then, in accordance with the two-dimensional projection data produced by accumulating the simultaneous count information by the two-dimensional projection data accumulating means and the three-dimensional projection data produced by accumulating the simultaneous count information by the three-dimensional projection data accumulating means, the image reconstructing means reconstructs an image representing the spatial distribution of frequencies of occurrence of photon pairs in the measurement space.

For example, to perform the simultaneous radiation and transmission measurement, the subject into which a radiopharmaceutical has been injected is placed in the measurement field of view and the radiation source support means supports the calibration positron emission radiation source at a predetermined position of the rotating ceptor to perform the measurement. Upon this measurement, the rotating ceptor is rotated in conjunction with the calibration positron emission radiation source, and the rotating ceptor position determination means detects the rotational position of the rotating ceptor.

Then, in accordance with the detected results, the simultaneous count information detected by a pair of photon detectors of the detector portion is determined to be either two dimensional or three dimensional. Additionally, the simultaneous count information is separated in accordance with the sinogram window method to accumulate the two-dimensional radiation data and the transmission data in separate memories of the two-dimensional projection data accumulating portion as well as the three-dimensional projection data in the three-dimensional projection data accumulating portion.

When the measurement has been completed, the radiation data is corrected for absorption in accordance with the transmission data, and then a three-dimensional image is reconstructed in accordance with the corrected radiation data. In this manner, the two-dimensional transmission data and the three-dimensional radiation data is obtained at the same time in one measurement.

On the other hand, the PET device according to the present invention, wherein a blocking plate for blocking photons produced by positrons emitted from a positron emission radiation source supported by the radiation source support means is provided on a side of the rotating ceptor. In this case, insufficiently collimated photons are blocked which have been caused by passing through part of the circumferential direction of the rotating ceptor. This makes it possible to clearly distinguish between the two-dimensional projection data and the three-dimensional projection data.

Furthermore, upon the transmission measurement and the blank measurement using the calibration positron emission radiation source, it is possible to prevent incidence of photons upon the photon detectors near the rotating ceptor (that are not located behind the rotating ceptor) and prevent an abnormal increase in count rate of the photon detectors.

Furthermore, the PET device according to the present invention further comprises rotating ceptor retract means for disposing the rotating ceptor in the measurement field of view and for retracting the rotating ceptor from the measurement field of view. In this case, for example, where no exact absorption correction or scattering correction is required as in the activation examination, all the photon detectors are used to detect the photons derived from the radio-pharmaceutical injected into the subject placed in the measurement field of view to accumulate the three-dimensional radiation data in the three-dimensional projection data accumulating portion, thereby making it possible to perform the three-dimensional radiation measurement with higher sensitivity.

BEST MODES FOR CARRYING OUT THE INVENTION

Now, the embodiments of the present invention will be explained below in more detail with reference to the accompanying drawings. In the descriptions of the drawings, the same components are designated with the same reference symbols, eliminating overlapped explanations.

(First Embodiment)

First, a PET device according to a first embodiment of the present invention is described below.

Figures 1A, 1B:
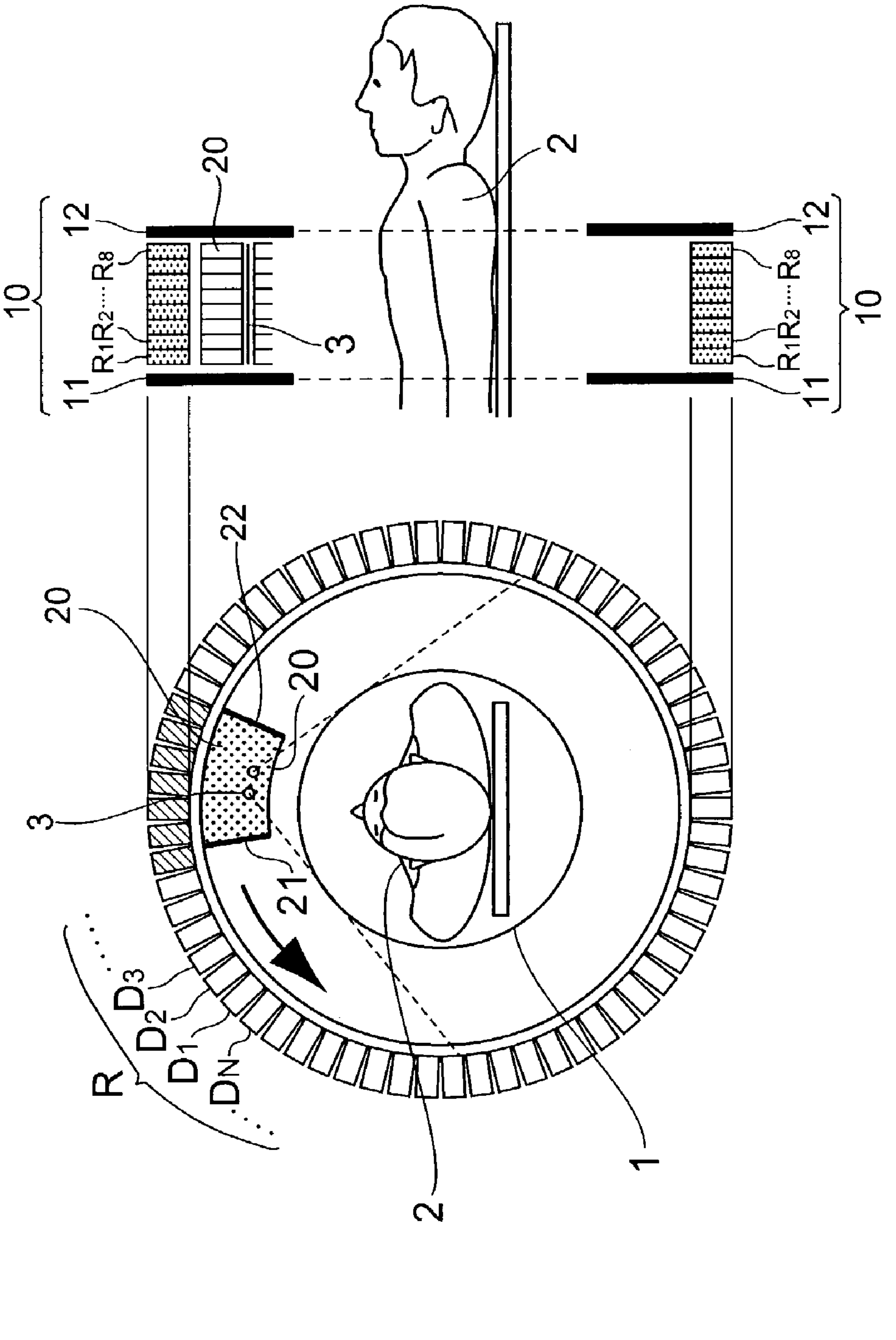
FIG. 1A and FIG. 1B are explanatory views illustrating the configuration of a detector portion and a rotating ceptor in a PET device according to a first embodiment.

FIG. 1A and FIG. 1B are explanatory views illustrating the configuration of a detector portion and a rotating ceptor in the PET device according to the first embodiment. FIG. 1A is a view illustrating a detector portion 10 when viewed in a direction parallel to the center axis, FIG. 1B being a cross-sectional view of the detector portion 10 taken along a plane containing the center axis.

Figure 2B:
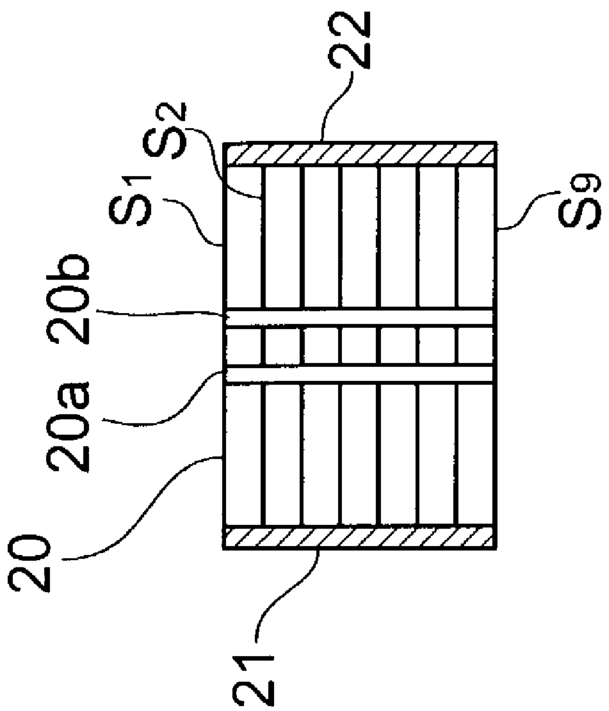
FIG. 2A and FIG. 2B are more detailed explanatory views illustrating the configuration of the rotating ceptor of the PET device according to the first embodiment.
Figure 2A:
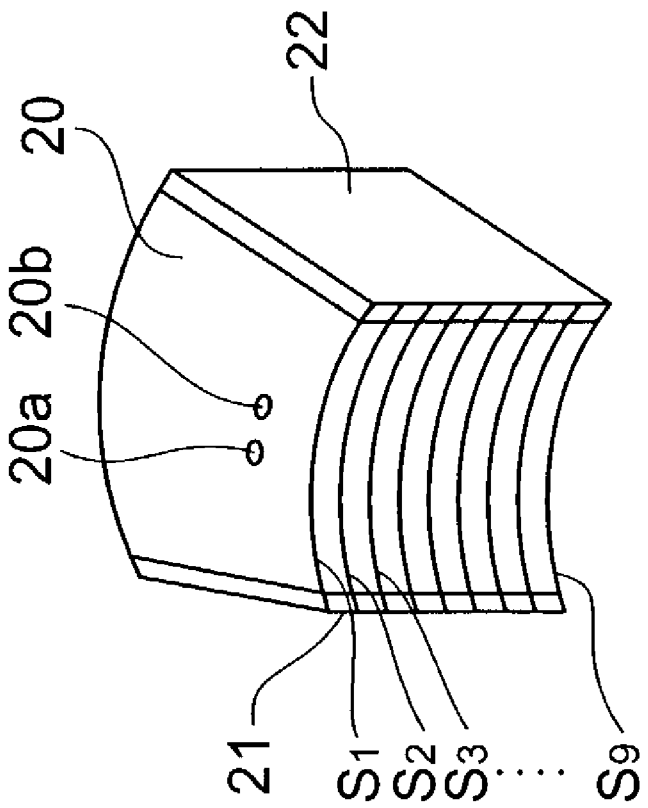

FIG. 2A and FIG. 2B are more detailed explanatory views illustrating the configuration of the rotating ceptor of the PET device according to the first embodiment, FIG. 2A being a perspective view, FIG. 2B being a cross-sectional view.

The detector portion 10 comprises detector rings $R_1$ to $R_8$ stacked in layers between a shield plate 11 and a shield plate 12. Each of the detector rings R has N photon detectors $D_1$ to $D_N$ that are annularly arrayed on a slice plane perpendicular to the center axis. Each of the photon detectors D is a scintillation detector into which a scintillator such as BGO ($Bi_4Ge_3O_{12}$) and a photo-multiplier tube are combined, and designed to detect photons that have traveled from a measurement field of view 1 containing the center axis and have reached there.

Additionally, the detector portion 10 is provided therein or in the measurement field of view 1 with the rotating ceptor 20. The rotating ceptor 20 comprises nine shield plates $S_1$ to $S_9$ that are disposed in parallel to each other between adjacent detector rings R. The shield plates $S_1$ to $S_9$ are each made of a material (e.g., tungsten or lead) that absorbs photon pairs or 511 keV gamma rays that are produced upon annihilation of electron positron pairs and travel in opposite directions.

The rotating ceptor 20 acts as a collimator, allowing only those photon pairs that have traveled approximately in parallel to the slice plane to be incident upon a photon detectors D located behind the photons.

The respective shield plates $S_1$ to $S_9$ are not annular in shape, and are provided on part of the N photon detectors $D_1$ to $D_N$ (seven photon detectors in FIG. 1A), constituting each of the detector rings R, toward the measurement field of view 1. The rotating ceptor 20 is rotatable about the center axis, designed to perform continuous rotations at a constant speed, stepped rotations, or reciprocating rotations. The rotational position of the rotating ceptor 20 is detected with a rotational position sensor or controlled with a ceptor rotation drive portion for controlling its rotations.

Each of the shield plates S of the rotating ceptor 20 is provided with a bar-shaped radiation source insertion holes 20*a* and 20*b* as radiation source support means that can insert and support a bar-shaped positron emission radiation source 3. That is, each of the bar-shaped radiation source insertion holes 20*a* and 20*b*, provided on each of the shield plates S of the rotating ceptor 20, removably supports a calibration positron emission radiation source 3 on a straight line parallel to the center axis at a position at which the photons generated with the positron emitted from the positron emission radiation source 3 are collimated with the rotating ceptor 20 in all directions parallel to the slice plane.

In this embodiment, a plurality of bar-shaped radiation source insertion holes as the radiation source support means are provided. This is because by using a plurality of positron emission radiation sources in consideration of the half life of the calibration positron emission radiation source 3 (e.g., a half-life of 271 days for $^{63}Ge—^{68}Ga$), the most degraded positron emission radiation source is replaced in sequence, thereby reducing maintenance costs for the radiation sources.

On the other hand, each of the shield plates S of the rotating ceptor 20 is designed in shape and dimension to allow the measurement field of view 1 to be sufficiently covered with the transmission data that is obtained by the transmission measurement using the calibration positron emission radiation source 3 supported by the bar-shaped radiation source insertion hole 20*a* or 20*b* (see the dotted lines in FIG. 1A). Allowing the number of photon detectors D located behind the rotating ceptor 20 be n, the value of n/N is preferably ½ or less, more preferably ⅒ to ⅙.

Furthermore, the rotating ceptor 20 is provided on the side thereof with blocking plates 21 and 22. These blocking plates 21 and 22 are provided on either circumferential side of the rotating ceptor 20 to block those photons that have been produced with positrons emitted from the positron emission radiation source 3 supported by the radiation source support means (the bar-shaped radiation source insertion hole 20*a* or 20*b*), thereby preventing the incidence of photons upon those photon detectors D other than the photon detectors D located behind the rotating ceptor 20. These blocking plates 21 and 22 are also made of a material (e.g., tungsten or lead) that absorbs the 511 keV gamma rays.

Described below is an example of specific dimensions for the detector portion 10 and rotating ceptor 20 in a PET device intended for use with the whole body examination. For example, the inner diameter of each of the detector rings R is 900 mm, the axial pitch of each of the detector rings R is 5 mm, the number of the detector rings R is 48, and the axial length of the measurement field of view 1 is 240 mm. With this configuration, preferably, each of the shield plates S of the rotating ceptor 20 is made of tungsten, 1 mm in thickness, 120 mm in depth, and has bar-shaped radiation source insertion holes 20*a* and 20*b* located about 30 to 40 mm from the front edge.

Additionally, the blocking plates 21 and 22 are preferably made of lead and 4 mm to 6 mm in thickness. In a case where the detector portion 10 and the rotating ceptor 20 having dimensions as described above are used, with the subject 2 not being placed in the measurement field of view 1, the single count rate is maximum at the photon detectors D near the positron emission radiation source 3 at the center of the axial field of view. The single count rate at the photon detectors D (except for the photon detectors D located behind the rotating ceptor 20) that contributes to the radiation measurement is restrained to 30% or less than the aforementioned maximum count rate.

Figures 3A, 3B, 3C:
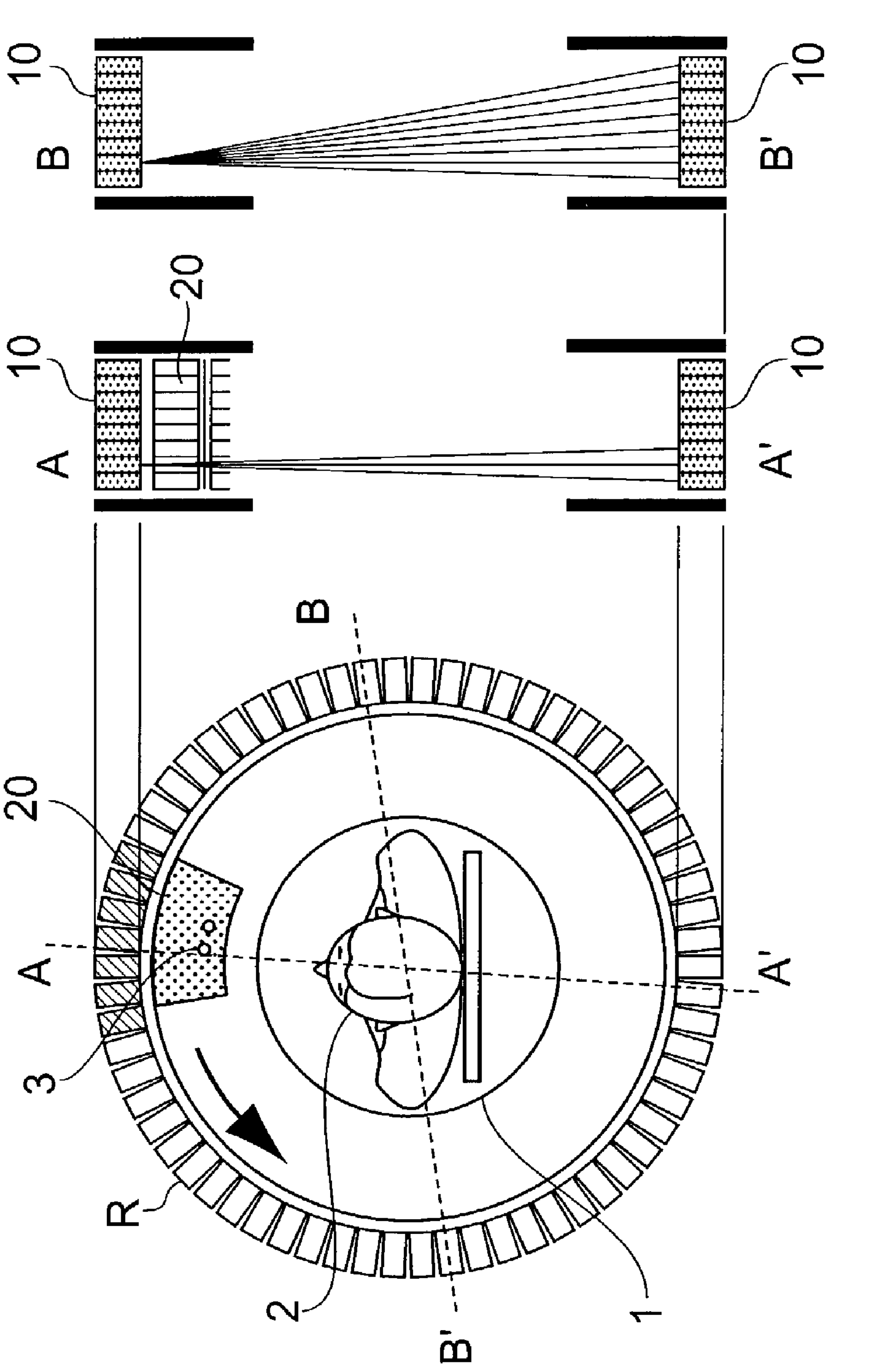
FIG. 3A, FIG. 3B, and FIG. 3C are explanatory views illustrating the simultaneous counting at the detector portion of the PET device according to the first embodiment.

FIG. 3A, FIG. 3B, and FIG. 3C are explanatory views illustrating the simultaneous counting at the detector portion of the PET device according to the first embodiment. FIG. 3A is a view illustrating the detector portion 10 when viewed in a direction parallel to the center axis. FIG. 3B is a cross-sectional view taken along broken line A–A' of FIG. 3A. The broken line A–A' passes through the center axis and the rotating ceptor 20. FIG. 3B also shows the simultaneous count lines for the photon pairs derived from the positron emission radiation source 3 supported by the radiation source support means (bar-shaped radiation source insertion hole 20*a* or 20*b*).

The photon pairs derived from the positron emission radiation source 3 are collimated with the rotating ceptor 20, and therefore detected with the same detector rings R or a pair of photon detectors contained in the adjacent (or closely located) detector rings R. That is, in this case, with the subject 2 being placed in the measurement field of view 1, the two-dimensional transmission data is acquired, while the two-dimensional blank data is acquired with the subject 2 not being placed in the measurement field of view 1.

FIG. 3C is a cross-sectional view taken along broken line B–B' of FIG. 3A. The broken line B–B' passes through the center axis but not through the rotating ceptor 20. FIG. 3C shows the simultaneous count lines for the photon pairs derived from the radio-pharmaceutical injected into the subject 2 placed in the measurement field of view 1. The photon pairs derived from the radio-pharmaceutical injected into the subject 2 are detected with a pair of photon detectors contained in any detector rings R without being collimated by the rotating ceptor 20. That is, in this case, three-dimensional radiation data is acquired.

Figure 4:
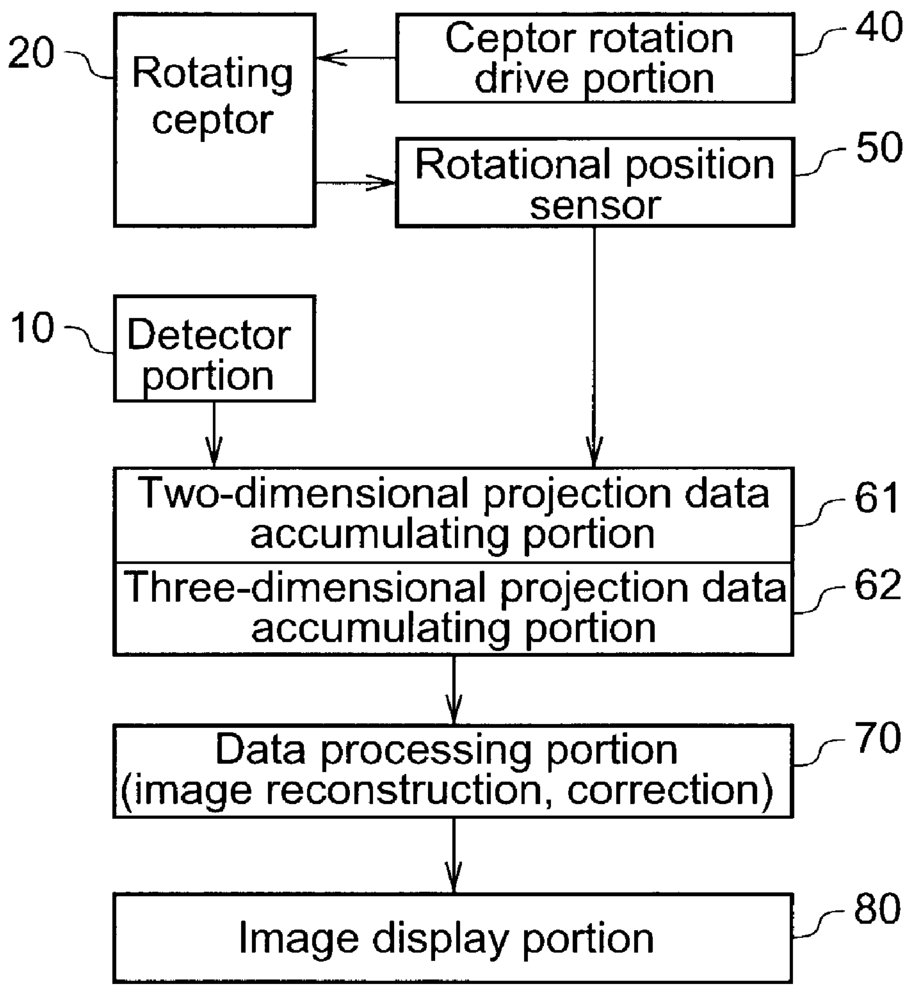
FIG. 4 is a conceptual block diagram illustrating the entire configuration of the PET device according to the first embodiment.

FIG. 4 is a conceptual block diagram illustrating the entire configuration of the PET device according to the first embodiment. A ceptor rotation drive portion 40 rotationally drives the rotating ceptor 20 about the center axis, while a rotational position sensor 50 detects the rotational position of the rotating ceptor 20. During one cycle of measurement performed with the subject 2 being placed in the measurement field of view 1, the rotating ceptor 20 is rotationally driven with the ceptor rotation drive portion 40, while the rotational position of the rotating ceptor 20 is constantly monitored with the rotational position sensor 50.

When a pair of photon detectors has simultaneously counted a photon pair, it is determined whether at least one of the pair of photon detectors is located behind the rotating ceptor 20. This determination is performed in accordance with the rotational position of the rotating ceptor 20 detected with the rotational position sensor 50.

If the one photon detector has been determined to be located behind the rotating ceptor 20, the simultaneous count information detected by the pair of photon detectors is determined to be two-dimensional simultaneous count information, which is in turn accumulated in a two-dimensional projection data accumulating portion 61.

On the other hand, if not, the simultaneous count information detected by the one pair of photon detectors is determined to be three-dimensional simultaneous count information, which is in turn accumulated in a three-dimensional projection data accumulating portion 62.

In this manner, the two-dimensional simultaneous count information and the three-dimensional simultaneous count information is accumulated separately from each other, thereby allowing for preparing the two-dimensional projection data (the transmission data or the blank data) and the three-dimensional projection data (the radiation data). A data processing portion 70 prepares the three-dimensional radiation data that has been subjected to sensitivity correction, scattering correction, and absorption correction in accordance with the two-dimensional projection data and the three-dimensional projection data, thereby reconstructing a three-dimensional image that represents the spatial distribution of the frequency of occurrence of photon pairs in the subject 2. An image display portion 80 displays images that have been reconstructed in the data processing portion 70.

In the simultaneous radiation and transmission measurement or the transmission measurement after injection, the aforementioned two-dimensional projection data is accumulated with the radiation data and the transmission data being mixed. However, the data is separated through the sinogram window method, described below, to be then each collected in separate memories.

Figure 5B:
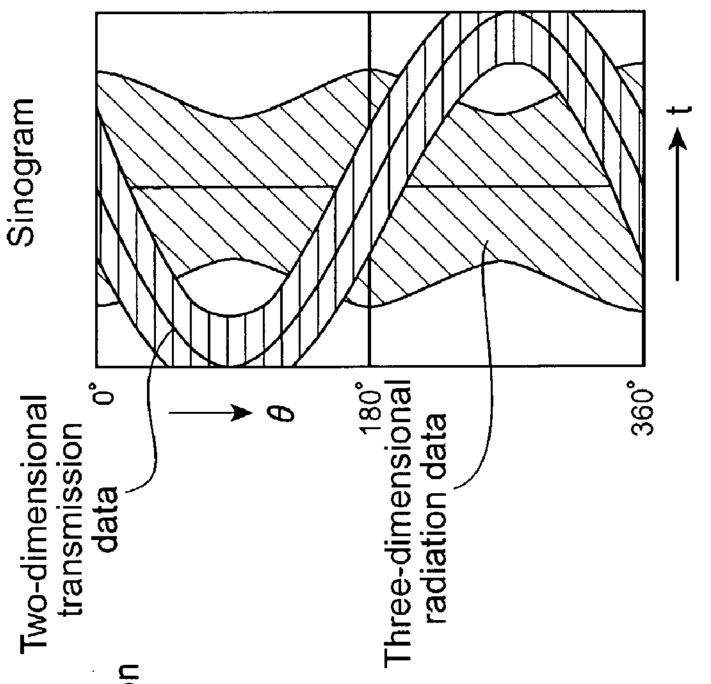
FIG. 5A and FIG. 5B are explanatory views illustrating the sinogram window method for the PET device according to the first embodiment.
Figure 5A:
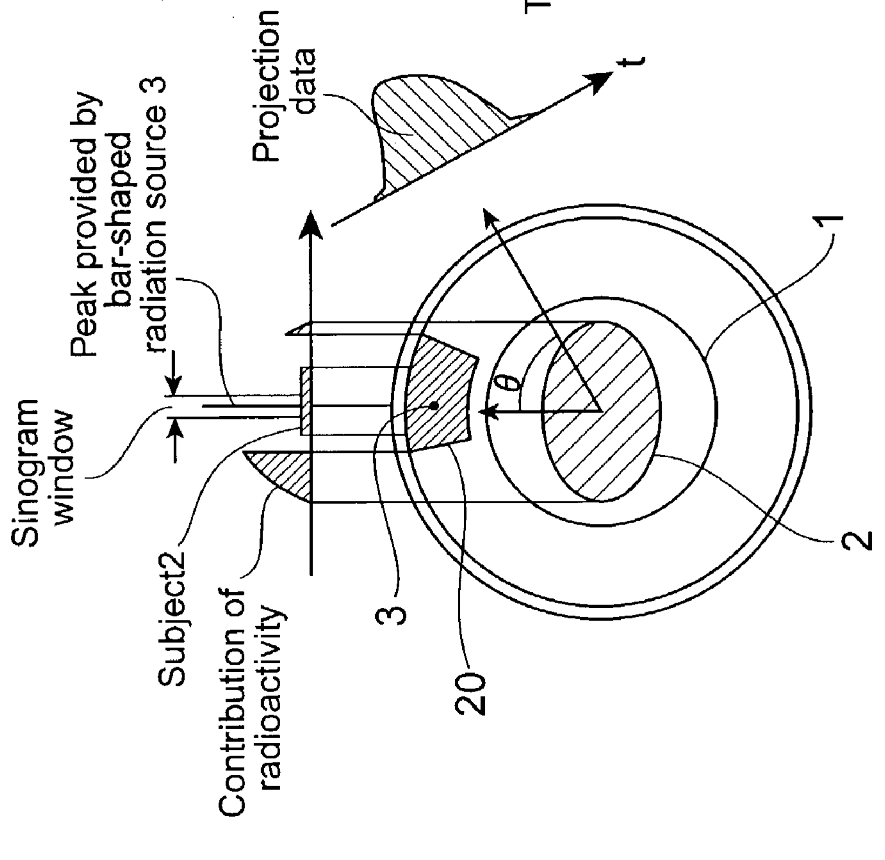

FIG. 5A and FIG. 5B are explanatory views illustrating the sinogram window method for the PET device according to the first embodiment. FIG. 5A is a view illustrating the projection data on the slice plane perpendicular to the center axis, FIG. 5B being a view illustrating the sinogram of the projection data. FIG. 5B shows the sinograms of each of the two-dimensional projection data and the three-dimensional projection data being overlapped with each other. However, in practice, in accordance with the rotational position of the rotating ceptor 20 detected with the rotational position sensor 50, the two-dimensional projection data is collected in the two-dimensional projection data accumulating portion 61, while the three-dimensional projection data is collected in the three-dimensional projection data accumulating portion 62.

As shown in FIG. 5B, the data derived from the calibration positron emission radiation source 3 appears in the shape of a sinusoidal curve on the sinogram, in which the sinusoidal curve moves in the direction of θ according to the rotation of the rotating ceptor 20 and the positron emission radiation source 3. The position of the sinusoidal curve on the sinogram on which the data derived from the positron emission radiation source 3 can be known in accordance with the rotational position of the rotating ceptor 20 is detected by the rotational position sensor 50.

In this context, a region of a predetermined width containing the sinusoidal curve on the sinogram in which the data derived from the positron emission radiation source 3 appears is defined as a sinogram window. The data within this sinogram window is defined as the two-dimensional transmission data, while the data outside the sinogram window is defined as the two-dimensional radiation data, the transmission data and the radiation data being collected separately from each other.

The data within the sinogram window (the two-dimensional transmission data) has data derived from the radio-pharmaceutical injected into the subject 2 mixed therein, but can be corrected by subtracting the data estimated based on the two-dimensional transmission data near the sinogram window from the two-dimensional transmission data. The collimation operation of the rotating ceptor 20 allows the data derived from the radio-pharmaceutical injected into the subject 2 to contribute to the two-dimensional projection data far less significantly when compared with the three-dimensional projection data. Therefore, the amount of the aforementioned correction is far less when compared with the conventional two-dimensional PET device, thereby allowing for the provision of accurate transmission data.

On the other hand, part of the data (which is essentially to be the two-dimensional transmission data) derived from the calibration positron emission radiation source 3 is contained in the two-dimensional radiation data outside the sinogram window due to scattering. However, it is possible to correct the data by subtracting the two-dimensional transmission data multiplied by a predetermined coefficient from the two-dimensional radiation data. An extremely lower amount of data derived from the calibration positron emission radiation source 3 is mixed with the three-dimensional radiation data, and thus may be neglected.

Figure 10A:
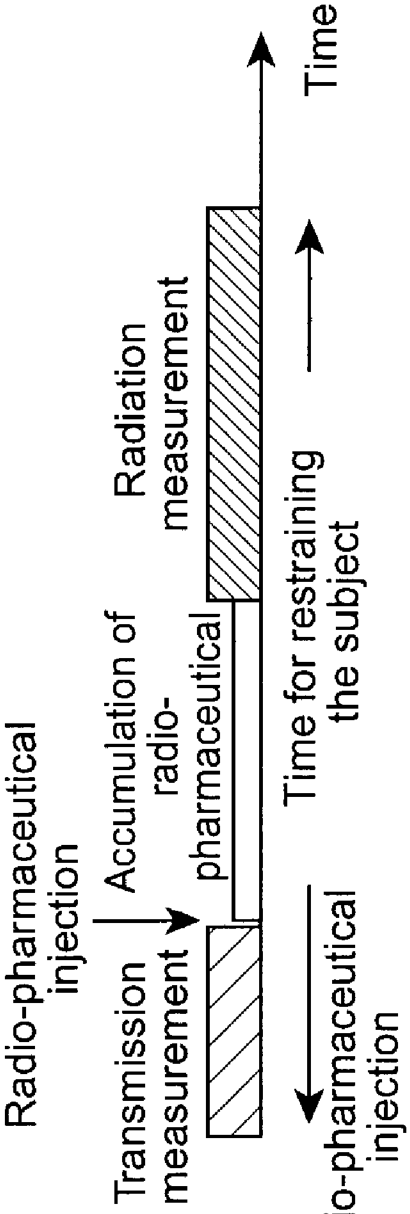
FIG. 10A, FIG. 10B, and FIG. 10C are explanatory views illustrating a time schedule for a radiation measurement and a transmission measurement.
Figure 10B:
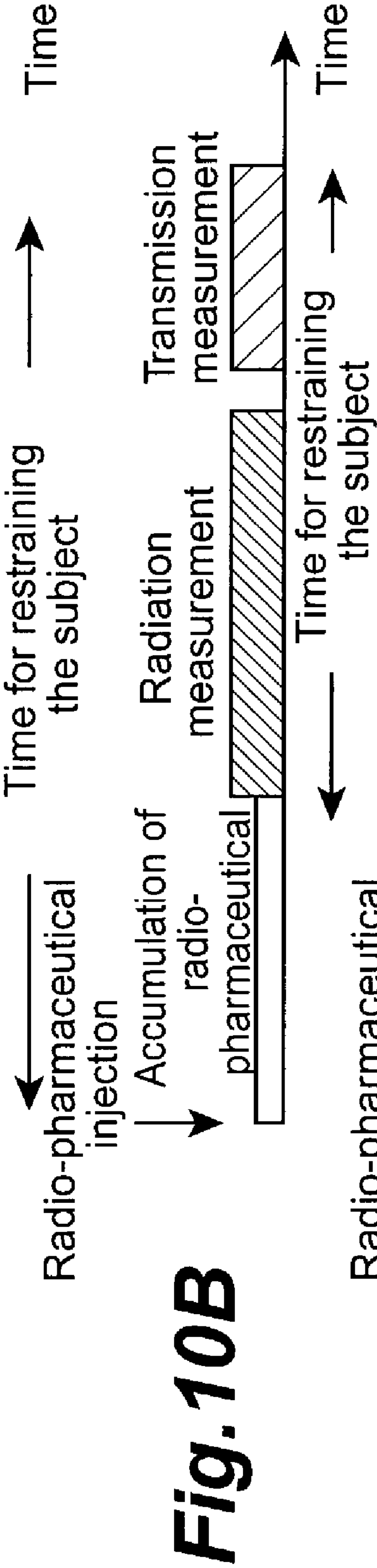
Figure 10C:
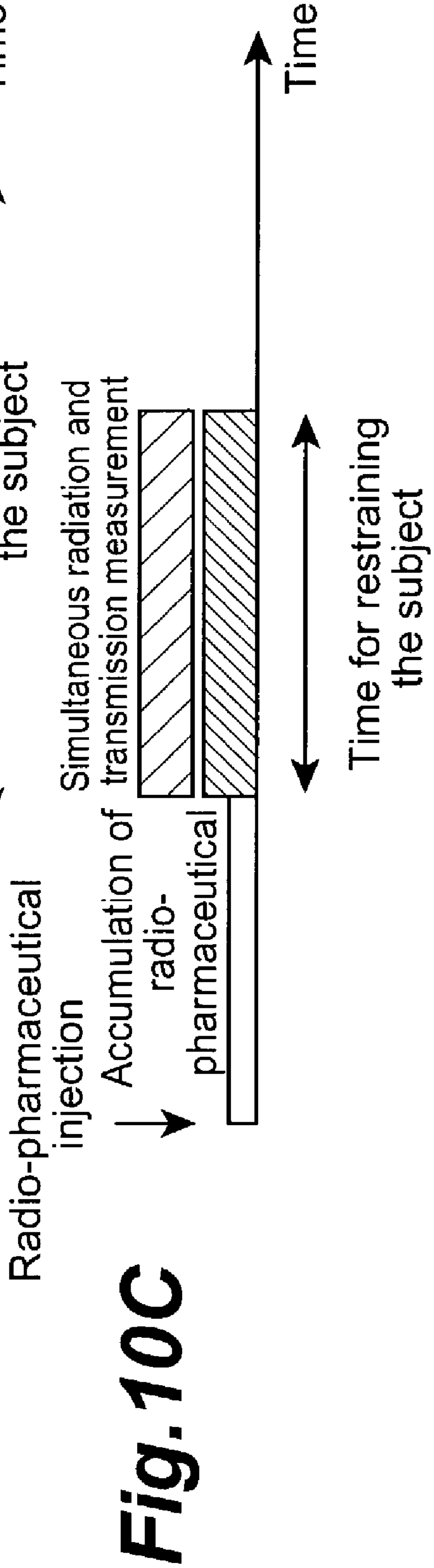
Figure 11B:
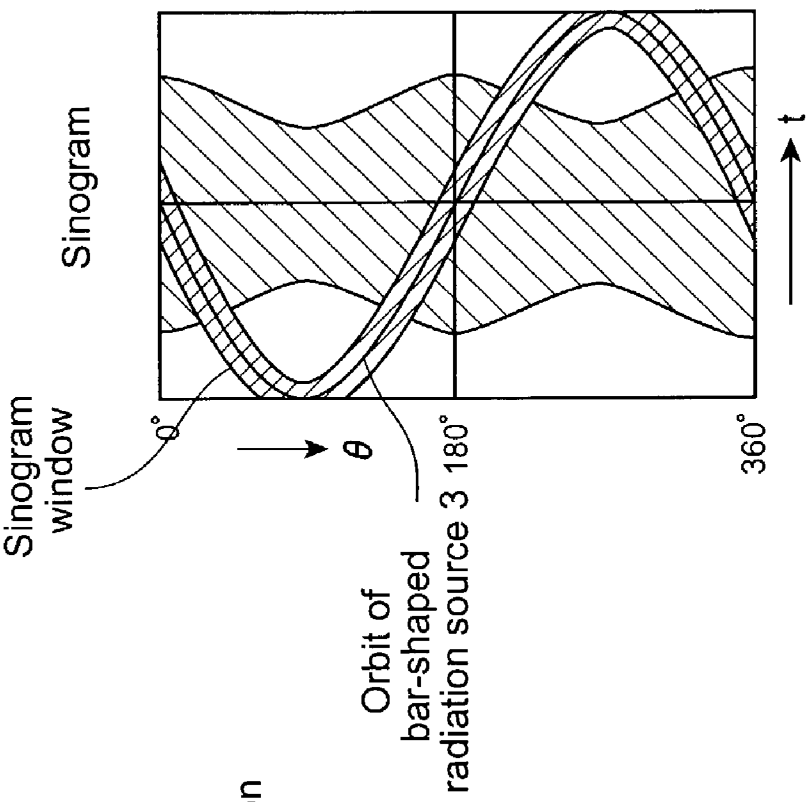
FIG. 11A and FIG. 11B are explanatory views illustrating the sinogram window method.
Figure 11A:
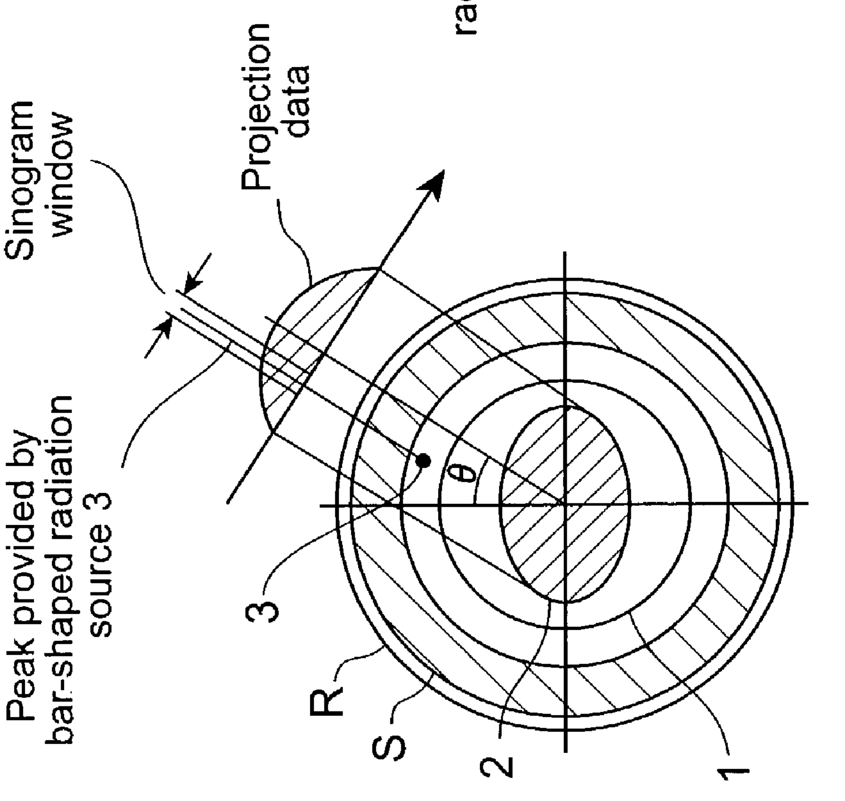

The simultaneous radiation and transmission measurement (see FIG. 10C) using the PET device according to the first embodiment is carried out as follows. A radio-pharmaceutical is injected into the subject 2, and then a period of time is allowed to elapse which is required for the radio-pharmaceutical to accumulate into a target organ of the subject 2. The measurement is performed with the subject 2 being placed in the measurement field of view 1 and the calibration positron emission radiation source 3 being inserted into the bar-shaped radiation source insertion hole 20*a* or 20*b* of the rotating ceptor 20. This measurement allows the ceptor rotation drive portion 40 to rotate the rotating ceptor 20 and the rotational position sensor 50 to detect the rotational position of the rotating ceptor 20.

In accordance with the detected results, the simultaneous count information detected by the pair of photon detectors of the detector portion 10 is determined to be either two dimensional or three dimensional. Additionally, the simultaneous count information is separated in accordance with the aforementioned sinogram window method, so that the two-dimensional transmission data is accumulated in the two-dimensional projection data accumulating portion 61, while the three-dimensional radiation data is accumulated in the three-dimensional projection data accumulating portion 62. After the measurement, the data processing portion 70 corrects for the absorption in the radiation data in accordance with the transmission data, reconstructs a three-dimensional image in accordance with the corrected radiation data, allowing the image display portion 80 to display the reconstructed image.

The transmission measurement after injection (see FIG. 10B) using the PET device according to the first embodiment is carried out as follows. A radio-pharmaceutical is injected into the subject 2, and then a period of time is allowed to elapse which is required for the radio-pharmaceutical to accumulate into a target organ of the subject 2. The radiation measurement is performed with the subject 2 being placed in the measurement field of view 1. This radiation measurement allows the ceptor rotation drive portion 40 to rotate the rotating ceptor 20 and also the rotational position sensor 50 to detect the rotational position of the rotating ceptor 20.

In accordance with the detected results, the simultaneous count information detected by the pair of photon detectors of the detector portion 10 is determined to be either two dimensional or three dimensional. Accordingly, the two-dimensional radiation data is accumulated in the two-dimensional projection data accumulating portion 61, while the three-dimensional radiation data is accumulated in the three-dimensional projection data accumulating portion 62.

After the radiation measurement, the calibration positron emission radiation source 3 is inserted into the bar-shaped radiation source insertion hole 20*a* or 20*b* of the rotating ceptor 20 to perform the transmission measurement. This transmission measurement allows the ceptor rotation drive portion 40 to rotate the rotating ceptor 20 and also the rotational position sensor 50 to detect the rotational position of the rotating ceptor 20. In accordance with the detected results, the simultaneous count information detected by the pair of photon detectors of the detector portion 10 is determined to be either two dimensional or three dimensional. Additionally, the simultaneous count information is separated based on the aforementioned sinogram window method to accumulate the two-dimensional transmission data in the two-dimensional projection data accumulating portion 61.

After the measurement, the data processing portion 70 performs correction for scattering in accordance with the two-dimensional radiation data and the three-dimensional radiation data that has been obtained in the aforementioned radiation measurement. Furthermore, the data processing portion 70 performs correction for absorption in the radiation data in accordance with the aforementioned transmission data, and then reconstructs a three-dimensional image in accordance with the corrected radiation data, allowing the image display portion 80 to display the reconstructed image. In the transmission measurement after injection, the two-dimensional radiation data less affected by the scattering simultaneous count is used to correct for scattering, thereby making it possible to provide more highly qualitative PET images when compared with the aforementioned simultaneous radiation and transmission measurement method.

On the other hand, the blank measurement using the PET device according to the first embodiment is carried out as follows. With the subject 2 not being placed in the measurement field of view 1, the calibration positron emission radiation source 3 is inserted into the bar-shaped radiation source insertion hole 20*a* or 20*b* of the rotating ceptor 20 to perform the blank measurement. This blank measurement allows the ceptor rotation drive portion 40 to rotate the rotating ceptor 20 and also the rotational position sensor 50 to detect the rotational position of the rotating ceptor 20.

In accordance with the detected results, only the two-dimensional information is selected from the simultaneous count information detected by the pair of photon detectors of the detector portion 10 to accumulate the two-dimensional projection data (blank data) in the two-dimensional projection data accumulating portion 61. After the blank measurement has been completed, the data processing portion 70 calculates the sensitivity correction coefficient of each photon detector in accordance with the blank data to store the sensitivity correction coefficients in a memory, which are to be used in the correction of sensitivity of each photon detector.

In a case where the PET device according to this embodiment is used for simultaneous radiation and transmission measurement or transmission measurement after injection, most of the photons incident upon the photon detectors D located behind the rotating ceptor 20 are derived from the calibration positron emission radiation source 3, while most of the other photons incident upon the other photon detectors D are derived from the radio-pharmaceutical injected into the subject 2.

Accordingly, within the maximum allowable single count rate of each of the photon detectors D, it is possible to independently select the optimum radioactivity of the positron emission radiation source 3 and the radio-pharmaceutical injected into the subject 2. As a result, it is possible to significantly improve the statistical accuracy of each of the radiation data and the transmission data when compared with the conventional cases. Additionally, it is also possible to shorten the measurement time and the time required for the subject 2 to be restrained. Furthermore, the simultaneous radiation and transmission measurement made practically available makes it possible to prevent artifacts from being produced due to displacements of the subject 2.

As described above, the PET device according to this embodiment makes it possible to simultaneously perform the three-dimensional radiation measurement with high sensitivity and the two-dimensional transmission measurement with high accuracy. The measurements can also be performed in a short period of time to thereby provide improved throughput. Additionally, it is also possible to obtain reconstructed images with high accuracy. The time required for the subject 2 to be restrained is significantly reduced, thereby facilitating the PET diagnosis for aged and handicapped patients.

Furthermore, when compared with the simultaneous radiation and transmission measurement using the prior art two-dimensional PET device, the simultaneous radiation and transmission measurement using the PET device according to this embodiment provides a higher detection sensitivity in the radiation measurement. The PET device according to this embodiment also provides less mixture between the radiation data and the transmission data (cross-talk), thereby making it possible to provide transmission data with high accuracy. Furthermore, the photons derived from the calibration positron emission radiation source 3 are collimated with reference to the subject 2 by means of the rotating ceptor 20, thereby significantly reducing the amount of exposure of the subject 2 to the radiation.

(Second Embodiment)

Figures 6A, 6B:
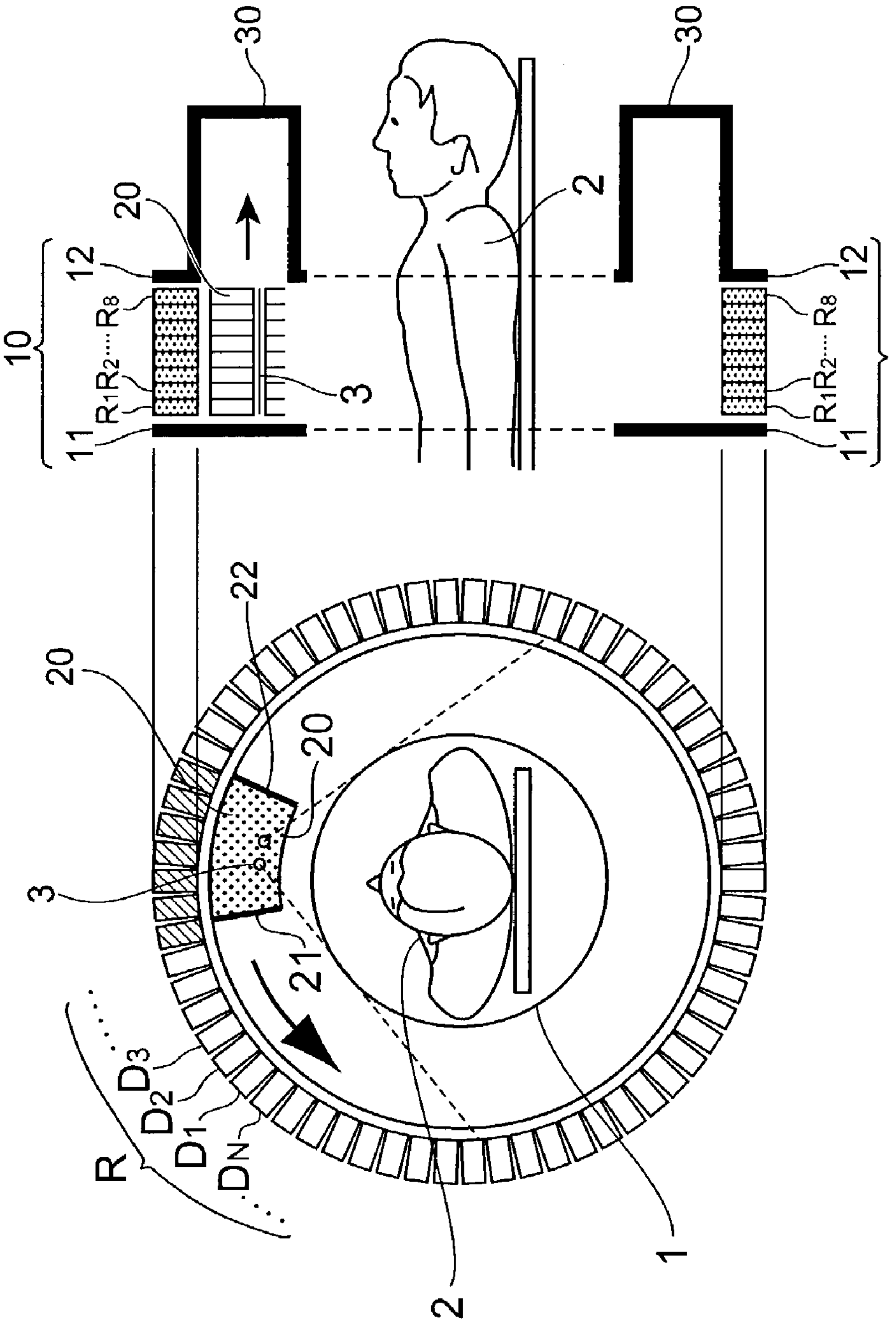
FIG. 6A and FIG. 6B are explanatory views illustrating the configuration of a detector portion and a rotating ceptor in a PET device according to a second embodiment.

Now, a PET device according to a second embodiment of the present invention will be described below. FIG. 6A and FIG. 6B are explanatory views illustrating the configuration of the detector portion 10 and the rotating ceptor 20 in a PET device according to the second embodiment. FIG. 6A is a view illustrating the detector portion 10 when viewed in a direction parallel to the center axis, FIG. 6B being a cross-sectional view of the detector portion 10 taken along a plane containing the center axis.

The PET device according to the second embodiment is different from the one according to the first embodiment in that the second embodiment is provided with the ceptor retract portion 30 having a space for retracting the rotating ceptor 20 therein, and with rotating ceptor retract means for placing the rotating ceptor 20 in the measurement field of view 1 and retracting the rotating ceptor 20 into the ceptor retract portion 30.

The PET device according to the second embodiment can provide the following operations and effects in addition to those of the first embodiment. That is, in a case where the radiation measurement is performed separately from the transmission measurement (see FIG. 10A and FIG. 10B), it is possible to detect photons derived from the radio-pharmaceutical injected into the subject 2 placed in the measurement field of view 1 and accumulate the three-dimensional radiation data in a three-dimensional radiation data accumulating portion 63 not only with the rotating ceptor 20 being rotated in the measurement field of view 1 but also with the rotating ceptor 20 being retracted into the ceptor retract portion 30.

The radiation measurement can be carried out with the rotating ceptor 20 being retracted into the ceptor retract portion 30, thereby performing the three-dimensional radiation measurement with higher sensitivity.

(Third Embodiment)

Figures 7A, 7B:
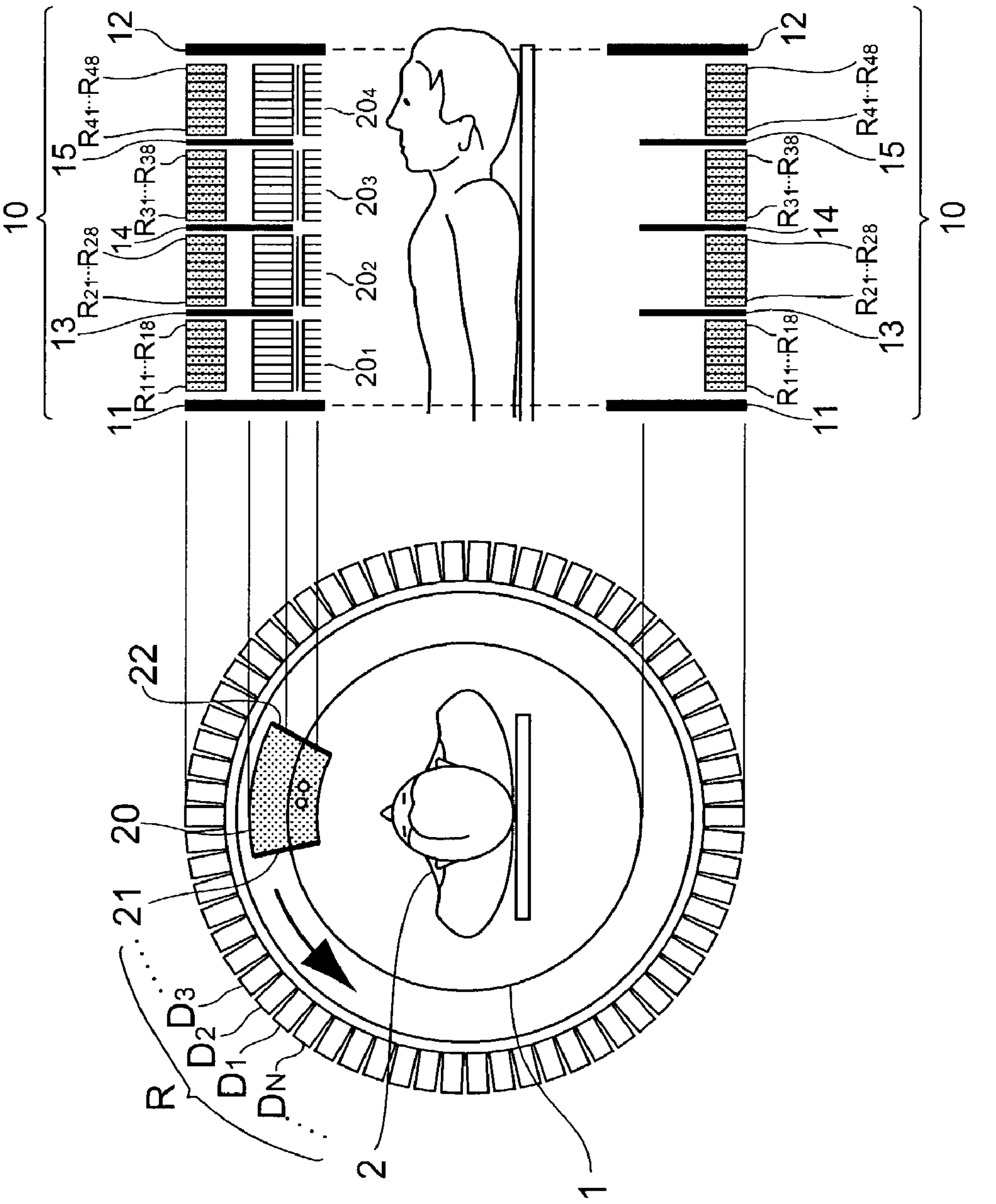
FIG. 7A and FIG. 7B are explanatory views illustrating the configuration of a detector portion and a rotating ceptor in a PET device according to a third embodiment.

Now, a PET device according to a third embodiment of the present invention will be described below. FIG. 7A and FIG. 7B are explanatory views illustrating the configuration of the detector portion 10 and the rotating ceptor 20 in a PET device according to the third embodiment. FIG. 7A is a view illustrating the detector portion 10 when viewed in a direction parallel to the center axis, FIG. 7B being a cross-sectional view of the detector portion 10 taken along a plane containing the center axis.

The PET device according to the third embodiment is different from the one according to the first embodiment in the following points. That is, the PET device according to the third embodiment is provided with coarse slice collimators 13 to 15 between the shield plate 11 and the shield plate 12 of the detector portion 10, detector rings $R_{11}$ to $R_{18}$ and a rotating ceptor $\mathbf{20}_1$ between the shield plate 11 and the slice collimator 13, detector rings $R_{21}$ to $R_{28}$ and a rotating ceptor $\mathbf{20}_2$ between the slice collimator 13 and the slice collimator 14, detector rings $R_{31}$ to $R_{38}$ and a rotating ceptor $\mathbf{20}_3$ between the slice collimator 14 and the slice collimator 15, and detector rings $R_{41}$ to $R_{48}$ and a rotating ceptor $\mathbf{20}_4$ between the slice collimator 15 and the shield plate 12.

Each of the detector rings $R_{11}$ to $R_{18}$, $R_{21}$ to $R_{28}$, $R_{31}$ to $R_{38}$, and $R_{41}$ to $R_{48}$ is the same as the detector ring R of the first embodiment. Furthermore, each of the rotating ceptors $\mathbf{20}_1$ to $\mathbf{20}_4$ is the same as the rotating ceptor 20 of the first embodiment.

The PET device according to the third embodiment can provide the following operations and effects in addition to those of the first embodiment. That is, each of the multiple detector rings R is provided with the coarse slice collimator 13, 14, or 15, thereby blocking photons incident at a large angle with respect to a slice plane. This alleviates the effects of the scattering simultaneous count as well as the count loss due to miscount by reducing the count rate of the photon detectors D.

Furthermore, in this embodiment, it is preferable that the detector portion 10 and the rotating ceptors $\mathbf{20}_1$ to $\mathbf{20}_4$ are moved integrally in a direction parallel to the center axis relative to the subject 2 placed in the measurement field of view 1. This makes it possible to detect photon pairs with a uniform sensitivity in the direction of the body axis of the subject 2 and provide uniform quantitative properties to the reconstruction of images.

The present invention is not limited to the aforementioned embodiments but may be modified in a variety of ways. For example, as having been already explained with reference to FIG. 2, the radiation source support means for supporting the calibration positron emission radiation source 3 in the rotating ceptor 20 may be the bar-shaped radiation source insertion holes 20*a* and 20*b* provided on each of the shield plates S of the rotating ceptor 20, but may also take another form.

FIG. 8A, FIG. 8B, FIG. 8C, FIG. 8D, and FIG. 8E are explanatory views illustrating modified example of a rotating ceptor and a calibration positron emission radiation source.

Figure 8A:
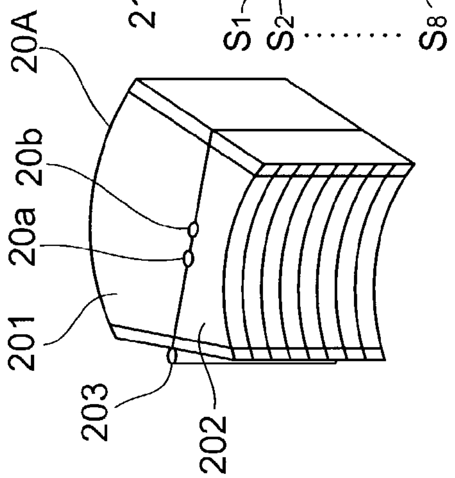
FIG. 8A, FIG. 8B, FIG. 8C, FIG. 8D, and FIG. 8E are explanatory views illustrating modified examples of a rotating ceptor and a calibration positron emission radiation source.

A rotating ceptor 20A shown in FIG. 8A can be split into halves of a first member 201 and a second member 202 with respect to an axis 203, adapted to form the bar-shaped radiation source insertion holes 20*a* and 20*b* when the first member 201 and the second member 202 are superimposed. That is, the rotating ceptor 20A allows the calibration positron emission radiation source 3 to be sandwiched between the first member 201 and the second member 202 and thereby supported at the position of the bar-shaped radiation source insertion hole 20*a* or 20*b*.

Figure 8B:
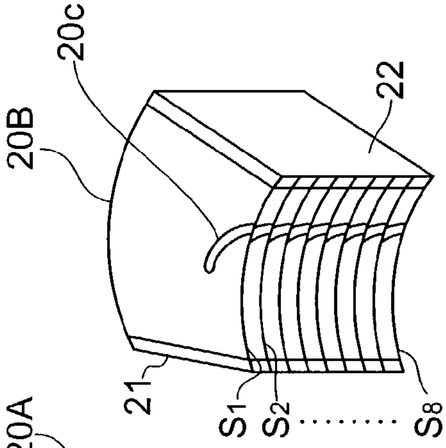

A rotating ceptor 20B shown in FIG. 8B has a groove 20*c* from the position at which the positron emission radiation source 3 is supported to an edge at each of the shield plates S. The rotating ceptor 20B allows the positron emission radiation source 3 to be inserted into the groove 20*c* from the edge of each of the shield plates S, thereby supporting the calibration positron emission radiation source 3. The groove 20*c* is curved, thereby causing the photons produced by the positrons emitted from the positron emission radiation source 3 to be collimated in all directions parallel to the slice plane.

Figure 8C:
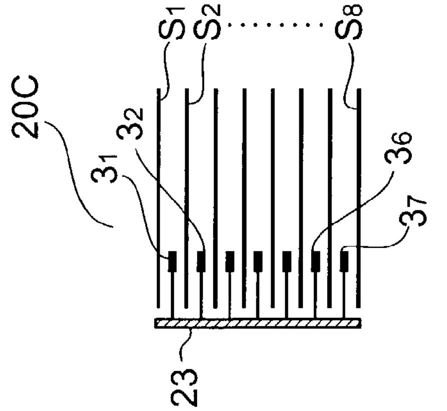

A rotating ceptor 20C shown in FIG. 8C has point radiation sources $\mathbf{3}_1$ to $\mathbf{3}_7$ supported by a support member 23 that are inserted in between the shield plates S. The support member 23 is preferably made of a material absorbing a small amount of gamma rays.

Figure 8D:
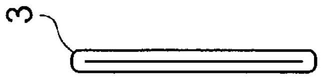
Figure 8E:
Figures 9A, 9B:
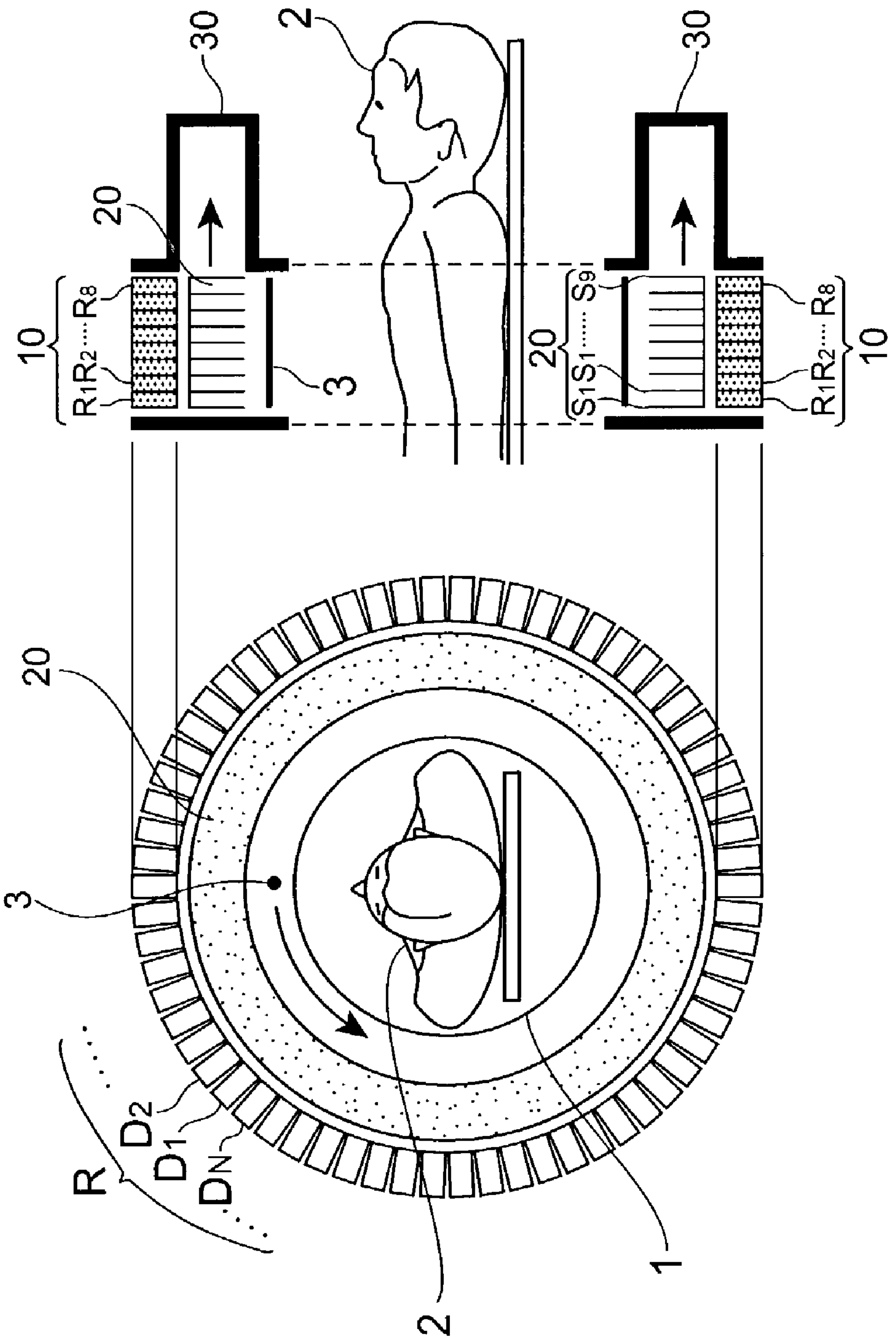
FIG. 9A and FIG. 9B are explanatory views illustrating the configuration of a detector portion and slice ceptor of a ceptor retractable PET device.

The calibration positron emission radiation source 3 used as shown in FIG. 2A, FIG. 2B, FIG. 8A, and FIG. 8B may be a radiation source uniform in the longitudinal direction as shown in FIG. 8D or alternatively maybe radiation sources disposed, like beads tied up in a string, at intervals equal to those of the shield plates S as shown in FIG. 8E.

INDUSTRIAL APPLICABILITY

The present invention is applicable to the PET device.

The invention claimed is:

1. A PET device comprising a detector portion having multiple detector rings on which multiple photon detectors each for detecting photons traveling from a measurement field of view containing a center axis are disposed on said slice plane perpendicular to said center axis, said multiple detector rings being stacked in layers in a direction parallel to said center axis, a rotating ceptor disposed rotatably about said center axis near said measurement field of view of part of said multiple photon detectors which constitute each of said multiple sets of detector rings, said rotating ceptor including multiple shield plates for collimating and passing therethrough only those photons that have traveled approximately parallel to said slice plane, radiation source support means for detachably supporting a calibration positron emission radiation source at a position at which photons produced by positrons emitted from the positron emission radiation source are collimated by said rotating ceptor in all directions parallel to said slice plane, wherein said calibration positron emission radiation source is arranged in said rotating ceptor;

rotating ceptor position determination means for determining whether said rotating ceptor is present near said measurement field of view of at least one of a pair of photon detectors when the pair of photon detectors of the photon detectors included in said detector portion simultaneously counts photon pairs, two-dimensional projection data accumulating means for accumulating simultaneous count information on photon pairs detected by said pair of photon detectors when said rotating ceptor position determination means has determined that said rotating ceptor is present near said measurement field of view of at least one of said pair of photon detectors, three-dimensional projection data accumulating means for accumulating simultaneous count information on photon pairs detected by said pair of photon detectors when said rotating ceptor position determination means has determined that said rotating ceptor is not present near any one of said measurement fields of view of said pair of photon detectors, and image reconstruction means for reconstructing an image representing a spatial distribution of frequencies of occurrence of photon pairs in said measurement field of view in accordance with the two-dimensional projection data produced by accumulating simultaneous count information by means of said two-dimensional projection data accumulating means and the three-dimensional projection data produced by accumulating simultaneous count information by means of said three-dimensional projection data accumulating means.

2. The PET device according to claim 1, wherein a blocking plate for blocking photons produced by positrons emitted from a positron emission radiation source supported by said radiation source support means is provided on a side of said rotating ceptor.

3. The PET device according to claim 1, further comprising rotating ceptor retract means for disposing said rotating ceptor in said measurement field of view and for retracting said rotating ceptor from said measurement field of view.

4. The PET device according to claim 1, wherein each of said shield plates of the rotating ceptor is provided with bar-shaped radiation source insertion holes as said radiation source support means that can insert and support the calibration positron emission radiation source.

5. The PET device according to claim 4, wherein the calibration positron emission radiation source is comprised of a plurality of point radiation sources supported by a support member that are inserted in between said shield plates, said bar-shaped radiation source insertion holes being said radiation source support means.

6. The PET device according to claim 1, wherein said rotating ceptor can be split into a first member and a second member, adapted to form bar-shaped radiation source insertion holes when said first member and said second member are superimposed, said bar-shaped radiation source insertion holes being said radiation source support means, and said rotating ceptor allows the calibration positron emission radiation source to be sandwiched between said first member and said second member, thereby supported at the position of said bar-shaped radiation source insertion holes.

7. The PET device according to claim 1, wherein a groove from the position at which the calibration positron emission radiation source is supported to an edge at each of said shield plates, and said rotating ceptor allows the calibration positron emission radiation source to be inserted into the groove from the edge of each of the shield plates, thereby supporting the calibration positron emission radiation source.

8. The PET device according to claim 7, wherein said groove is curved.

9. The PET device according to claim 1, wherein the calibration positron emission radiation source is a radiation source uniform in the longitudinal direction thereof.

10. The PET device according to claim 1, wherein the calibration positron emission radiation source is a radiation sources disposed at intervals equal to those of said shield plates.

* * * * *